Jan. 3, 1928. D. B. BRADNER Re. 16,841
METHOD AND APPARATUS FOR DISPERSING TOXIC AND OTHER IRRITANT SUBSTANCES
Original Filed May 15, 1924
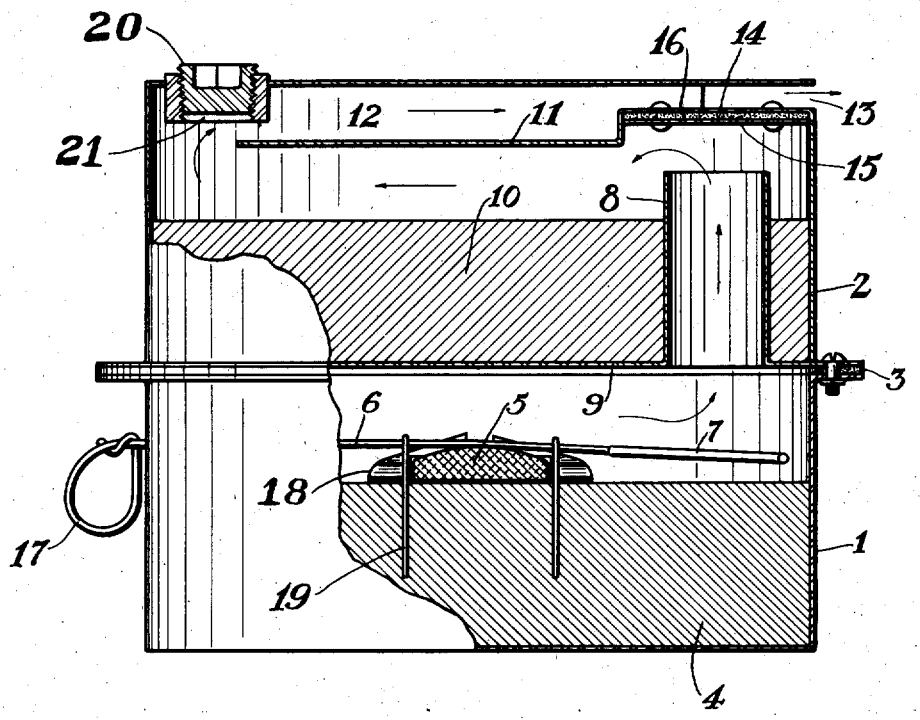
Donald B. Bradner
Inventor
By Chas. Silver
Attorney Reissued Jan. 3, 1928. Re. 16,841

UNITED STATES PATENT OFFICE.

DONALD B. BRADNER, OF HAMILTON, OHIO, ASSIGNOR, BY MESNE ASSIGNMENTS, TO FEDERAL LABORATORIES, INC., OF PITTSBURGH, PENNSYLVANIA, A CORPORATION OF DELAWARE.

METHOD AND APPARATUS FOR DISPERSING TOXIC AND OTHER IRRITANT SUBSTANCES.

Original No. 1,541,103, dated June 9, 1925, Serial No. 713,599, filed May 15, 1924. Application for reissue filed September 2, 1926. Serial No. 133,288.

This invention relates to the dispersion of toxic and irritant substances without substantial chemical decomposition.

Among the objects of this invention is to provide a process and apparatus for dispersing toxic and irritant substances, for example, diphenylaminechlorarsine and chloracetophenone, without producing substantial decomposition of the substances.

A further object of this invention is to provide a process and apparatus whereby toxic and irritant substances of the character heretofore described may be volatilized and dispersed in the air in a manner that avoids decomposition of a substantial portion of the evolved irritant or toxic material and whereby overheating of the toxic is practically reduced to a minimum.

A further object of this invention is to provide a portable apparatus serving as a candle wherein a vaporizable body of irritant is subjected to hot gases to vaporize the same, the hot gases acting as a vehicle for the vaporized irritant. Preferably, the evolved combustion gases are caused to pass over a body of the toxic or irritant in such manner as to avoid overheating of the toxic or irritant and thus prevent raising the body of such material or the evolved products therefrom to a temperature which would result in a substantial decomposition.

Other, further and more specific objects of the invention will become readily apparent to persons skilled in the art from a consideration of the following description when taken in conjunction with the drawing, wherein a specific form of a device for carrying out my invention is shown partly in elevation and partly in section, a portion of the device being broken away to illustrate the interior construction thereof.

This apparatus consists of a can having a lower compartment (1) bolted or otherwise fastened to the upper compartment (2), suitable packing material (3), for example asbestos paper, being provided to make a tight connection. At the bottom of compartment (1) is placed a suitable fuel mixture (4) upon which is placed a match composition (5). This match composition is set off by pulling the rod (6) which brings the scratcher composition (7) in contact with the match composition (5), the latter being sensitive to frictional engagement with the scratcher composition (7). When this match composition burns it ignites the fuel mixture (4) and the products of combustion pass out through the stack (8).

The stack (8) is connected to the plate (9) forming the base of the upper compartment (2). Upon this plate (9) is placed the toxic or irritant (10). As the products of combustion of the fuel (4) leave the stack (8) they pass over the surface of the toxic or irritant (10), being deflected by the baffle plate (11) so as to travel over practically the entire surface of the toxic or irritant material. These combustion gases heat the toxic or irritant and cause same to volatilize and become entrained in the combustion gases and pass out therewith through the conduit (12) leading to the opening (13) at the top of the can.

The portion (14) of the baffle plate (11), which is directly over the mouth of the stack (8) from which the combustion gases issue, is preferably re-enforced by plate (15) and asbestos material (16) is inserted between plates (14) and (15). This portion of the plate (11) is also near the exit opening (13) of the can and it is desirable to prevent as much as possible the heating of these gases as they issue from the can. By providing this asbestos (16), excessive heating by the combustion gases of the plate (11) at this point is eliminated to a large extent, if not completely avoided.

In order to facilitate the operation of the rod (6) carrying the scratcher composition (7), one end of rod (6) is provided with a handle (17). The match composition (5) is kept in position by means of a zinc strip (18) and the anchor wires (19) embedded in the fuel (4).

The fuel (4) may be a suitable explosive such as black powder, nitrocellulose, a mixture of nitrocellulose and nitroglycerine, a mixture of charcoal and $NH_4NO_3$ or a mixture of charcoal and $NaNO_3$.

A suitable match composition consists of $KClO_3$ (5 parts) and black antimony sulphide (2 parts) bound together by dextrine (1 part).

The scratcher composition may consist of red phosphorous (6 parts) and fine sand (3 parts) bound together by dextrine (2 parts).

The irritant is introduced into the upper compartment (2) by removing the plug (20) and pouring the molten or liquid irritant through the opening (21). This irritant may be either solid or liquid at ordinary temperatures. I prefer to use this device with such solid toxics as diphenylamine-chlorarsine or such solid irritants as chloracetophenone, although I may also use other halogen derivatives of acetophenone, such as bromacetophenone, p-bromchloracetophenone, or iodoacetophenone, or I may use chloracetotoluone, capsaicin or diphenylchlorarsine.

As is known, the halogen derivatives of acetophenone are capable of producing irritation and lachrymation at concentrations below .01 milligrams per liter in three minutes when persons are exposed thereto.

The device is operated by drawing the scratcher over the match composition, causing the latter to ignite and fire the fuel (4). The combustion gases of this fuel pass over the surface of the body of irritant, thereby heating and volatilizing the irritant. This exchange of heat raises the irritant to a temperature permitting the products of combustion, as they pass over the surface of the irritant, to carry off a considerable amount of the irritant vapors. The combustion gases are also partially cooled by this exchange of heat, thus preventing objectionable or serious decomposition of the irritant gases. The net effect of this lengthy passage of the combustion gases over the surface of the irritant is to accomplish the distillation of the irritant at a much lower temperature than would occur by direct heating and thereby avoiding exposure of the evolved irritant to temperatures promoting decomposition or chemical reaction rendering the volatilized material unfit for the purposes desired.

In my reissue Patent 16,495, there is disclosed and claimed a specific form of my broad invention in which the fuel and the irritant are in contact with one another and are preferably intimately distributed.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a method of dispersing an irritant without substantial chemical decomposition, passing a stream of hot products of combustion over the surface of a body of said irritant and carrying off the volatilized irritant as an entrained component of said products of combustion.

2. In a method of dispersing a toxic substance without substantial chemical decomposition, passing a stream of hot products of combustion over the surface of a body of said toxic and carrying off the volatilized toxic as an entrained component of said products of combustion.

3. In a method of dispersing a solid, organic irritant without substantial chemical decomposition, passing a stream of hot products of combustion over the surface of a body of said irritant and carrying off the volatilized irritant as an entrained component of said fuel gases, the temperature and rate of flow of said products of combustion being regulated so that said irritant will be maintained below a temperature promoting substantial chemical decomposition thereof.

4. In a method of dispersing an organic, toxic irritant without substantial chemical decomposition, passing a stream of hot products of combustion over the surface of a body of said irritant and carrying off the volatilized irritant as an entrained component of said products of combustion, the temperature and rate of flow of said fuel gases being regulated so that said irritant will be maintained below a temperature promoting substantial chemical decomposition thereof.

5. In a portable apparatus for dispersing an irritant without substantial chemical decomposition thereof, a compartment for holding fuel, another compartment for holding the irritant, means for delivering the combustion gases from the first compartment to the surface of the irritant within the second compartment and an exit passage for gases issuing from the said second compartment.

6. In an apparatus for dispersing an irritant without substantial chemical decomposition thereof, a compartment for holding fuel, another compartment for holding the irritant, means for delivering the combustion gases from the first compartment to the surface of the irritant within the second compartment, said means comprising a conduit extending from the upper portion of the first compartment to the upper portion of the second compartment, an exit passage for gases issuing from the said second compartment and means for igniting the fuel in the first compartment.

7. In a portable apparatus for dispersing an irritant without substantial chemical decomposition thereof, a lower compartment for holding fuel, an upper compartment above the first-named compartment for holding the irritant, means for conducting the exit gases to the surface of the irritant within the upper chamber and means for effecting a tortuous passage of the exit gases from the upper compartment.

8. In an apparatus for dispersing an irritant without substantial chemical decomposition thereof, a lower compartment for holding fuel, an upper compartment above the first-named compartment for holding the irritant, means comprising a stack communicating with the top of the lower compartment and extending into the upper portion of the upper compartment for conducting the exit gases to the surface of the irritant within the upper chamber and means comprising a baffle plate for effecting a tortuous passage of the exit gases from the upper compartment.

9. In an apparatus for dispersing an irritant without substantial chemical decomposition thereof, a compartment containing fuel, another compartment containing the irritant, means for delivering the combustion gases from the first compartment to the surface of the irritant within the second compartment and an exit passage for gases issuing from the said second compartment.

10. In an apparatus for dispersing an irritant without substantial chemical decomposition thereof, a lower compartment for holding fuel, an upper compartment above the first-named compartment for holding the irritant, means comprising a stack communicating with the top of the lower compartment and extending into the upper portion of the upper compartment for conducting the exit gases to the surface of the irritant within the upper chamber and means comprising a baffle plate for effecting a tortuous passage of the exit gases from the upper compartment.

11. In the method of dispersing a vaporizable irritant, subjecting a body of irritant to surface contact of hot gases within a container to vaporize such irritant, and utilizing the gases as a vehicle for the vaporized irritant to carry it out of the container.

12. In the method of dispersing a vaporizable irritant, causing combustion of a fuel, subjecting a body of irritant to surface contact by the heated products of combustion of such fuel so as to vaporize the irritant, such vaporization being effected within a container, and utilizing the fuel gases as a vehicle for the vaporized irritant to carry the same out of the container.

13. For the production of an incapacitating gas, a lachrymatory halogen derivative of acetophenone, and a combustible material so placed with respect thereto that the heated products of combustion come into contact with the halogen derivative and vaporize the same.

14. For the production of an incapacitating gas, a container having therein a vaporizable lachrymating organic compound, and a combustible material so placed with respect thereto that the heated products of combustion come into contact with the lachrymating organic compound an vaporize the same, the combustible material furnishing products of combustion which act as vehicular gases for carrying the vaporized lachrymating compound out of the container.

15. In the method of producing an incapacitating gas, burning a material capable of self-supporting combustion within a substantially closed container, subjecting a halogen derivative of acetophenone within the container to the heated products of combustion, and discharging the heated products of combustion, together with the halogen derivative of acetophenone vaporized thereby, from the container.

16. In an apparatus for dispersing an irritant, a substantially closed chamber having a discharge opening, a vaporizable irritant within the chamber, and a combustible within the chamber so placed with respect to the irritant that the heated products of combustion come into contact with the irritant and vaporize the same, said opening providing an outlet for the products of combustion and entrained vaporized irritant.

17. A unitary portable apparatus for dispersing an irritant, comprising a substantially closed container having a discharge opening, a lachrymatory halogen derivative of acetophenone within the container, and a combustible material so placed with respect thereto that the heated products of combustion come into contact with the halogen derivative and vaporize the same, said discharge opening providing an outlet for the products of combustion and the entrained vaporized halogen derivative.

18. The method of producing an incapacitating gas, which includes subjecting a lachrymating organic compound not readily vaporizable at ordinary temperatures and which lachrymates at a concentration below .01 milligrams per liter in three minutes, to heated gases generated by the burning of a material capable of self-supporting combustion, the heated gases when they act on the compound being at a temperature sufficient to volatilize the compound but below that at which the lachrymatory qualities are destroyed.

19. For the production of an incapacitating gas, a lachrymating organic compound not readily vaporizable at ordinary temperatures and which lachrymates at a concentration below .01 milligrams per liter in three minutes, and a combustible material so placed with respect thereto that the heated products of combustion come into contact with the compound and vaporize the same.

In testimony whereof I have hereunto set my hand.

DONALD B. BRADNER.